United States Patent
Lu

(10) Patent No.: US 8,718,834 B2
(45) Date of Patent: May 6, 2014

(54) MODULAR COMPUTER SYSTEM AND METHOD FOR CONTROLLING FANS OF THE SAME

(75) Inventor: Tsung-En Lu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 347 days.

(21) Appl. No.: 13/151,281

(22) Filed: Jun. 2, 2011

(65) Prior Publication Data
US 2012/0253544 A1    Oct. 4, 2012

(30) Foreign Application Priority Data
Apr. 2, 2011    (CN) .......................... 2011 1 0083103

(51) Int. Cl.
*G05D 23/00*    (2006.01)

(52) U.S. Cl.
USPC ....................... 700/300; 361/721; 361/679.48

(58) Field of Classification Search
USPC ............................. 700/300; 361/721, 679.48
See application file for complete search history.

(56) References Cited

U.S. PATENT DOCUMENTS

| 7,688,593 B2* | 3/2010 | Byers et al. ................... 361/721 |
| 2003/0112600 A1* | 6/2003 | Olarig et al. .................. 361/687 |
| 2009/0002938 A1* | 1/2009 | Stewart et al. ................ 361/687 |

FOREIGN PATENT DOCUMENTS

| CN | 1470866 | 1/2004 |
| CN | 101739104 | 6/2010 |

* cited by examiner

*Primary Examiner* — Tejal Gami
(74) *Attorney, Agent, or Firm* — Novak Druce Connolly Bove + Quigg LLP

(57) ABSTRACT

A modular computer system includes a fan tray comprising a number of fans, a number of slots, and sets of temperature sensors. A shelf manager stores a table that records the relationship in distance between the slots and the fans, and the correlation relationship between the slots and the sets of temperature sensors. The shelf manager monitors the temperatures of different portions of each field replaceable unit according to signals from the temperature sensors. When there is one or more monitored temperatures exceeding a preset value, the shelf manager determines which of the slots corresponds to the one or more monitored temperatures, determines the number of sensors that have detected the high temperatures, and adjusts the speed of the one or more fans adjacent to each determined slot according to the determined number of sensors.

3 Claims, 2 Drawing Sheets

MODULAR COMPUTER SYSTEM AND METHOD FOR CONTROLLING FANS OF THE SAME

BACKGROUND

1. Technical Field

The present disclosure relates to a modular computer platform.

2. Description of Related Arts

Modular platform systems are typically used in communication networks where reliability is increased and cost reduced by the use of interoperable components. Such interoperable components may include modular platform shelves or chassis. These modular platform chassis include one or more backplanes that couple to other interoperable components such as modules and/or devices. Modules may include, but are not limited to blades, carrier boards, processing boards, mezzanine cards, interconnects, etc. Devices may include, but are not limited to fans, power equipment modules (PEM), field replaceable units (FRUs), alarm boards, sensors, rear transition modules (RTMs), etc. Heat dissipation has always been an important concern and a difficult issue during the design of modular platforms.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
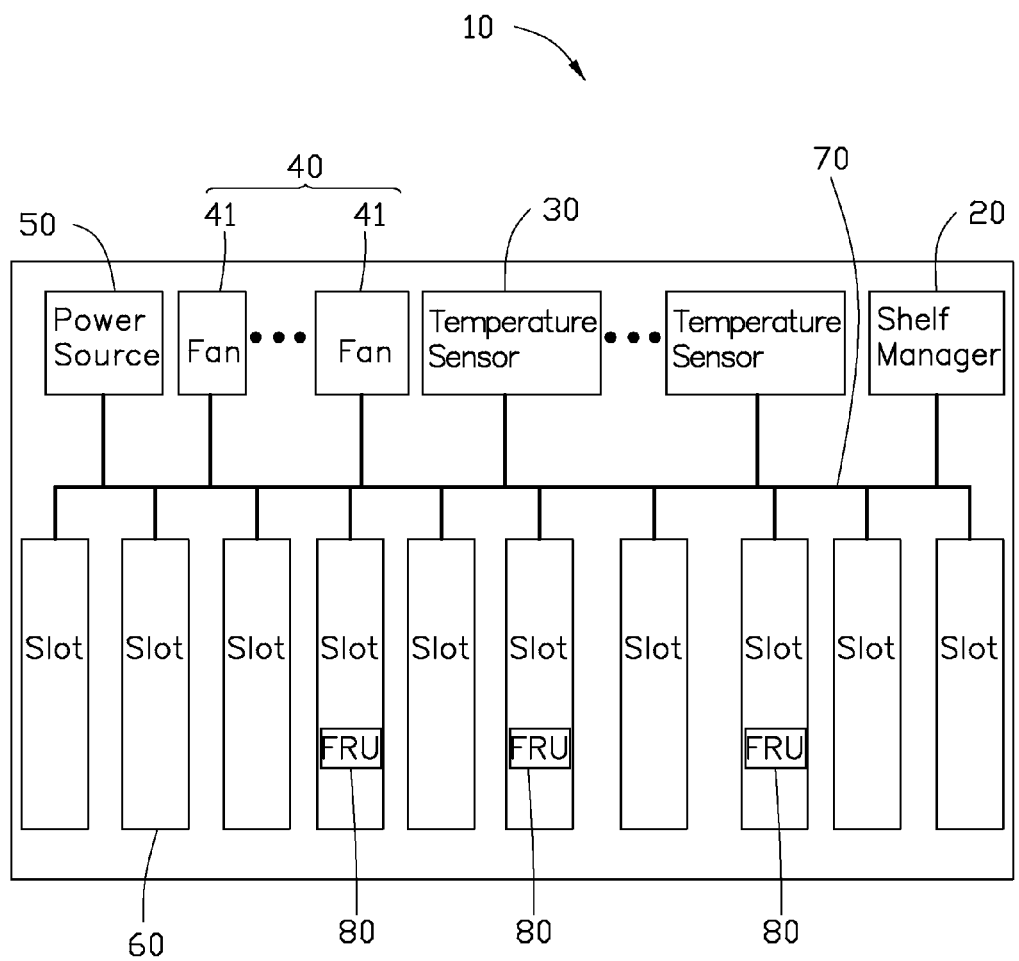
FIG. 1 is a schematic block diagram of a modular computing system according to an embodiment.

Referring to FIG. 1, a modular computer system 10 includes a shelf manager 20, a number of sets of temperature sensors 30, a fan tray 40, a power source 50, and a number of slots 60. The shelf manager 20 is connected to the sensors 30, the fan tray 40, and the slots 60 via a bus 70. The power source 50 is used to provide power to the system 10.

In the embodiment, each slot 60 corresponds to one set of sensors 30. The one set of sensors 30 are arranged adjacent to the slot 60 at different locations, to respectively detect temperatures of different portions of a field replaceable unit (FRU) 80 inserted in the slot 60.

The fan tray 40 includes a number of fans 41 used to cool the one or more field replaceable units 80. The shelf manager 20 is able to identify and separately control each fan 41. In the embodiment, the shelf manager 20 stores a table recording the correlation relationships between the fans 41 and the slots 60. The table also records the correlation relationships between each slot 60 and its corresponding set of sensors 30.

The shelf manager 20 receives signals from the sensors 30 and can thus monitor the temperatures of different portions of each field replaceable unit 80. When there is one or more monitored temperatures exceeding a preset value, the shelf manager 20 determines the slot(s) 60 corresponding to the one or more monitored temperatures, according to the table. The shelf manager 20 then determines the number of the sensors 30 that have detected the temperatures exceeding the preset value, for each slot 60. The shelf manager 20 then adjusts the speed of the one or more fans 41 adjacent to each determined slot 60 according to the determined number of the sensors 30. In other words, the more sensors 30 that detect high heat, the greater the adjustments to the speed of fans 41 to compensate.

For example, if, for one slot 60, the determined number of the sensors 30 is 3, the speed of the one or more fans 41 corresponding to the one slot 60 may be controlled to increase to 3000 rpm, while if the determined number is 6, the speed may be controlled to increase to 5000 rpm. As such, the fans 41 are dynamically adjusted according to the temperatures of the field replaceable units 80.

Figure 2:
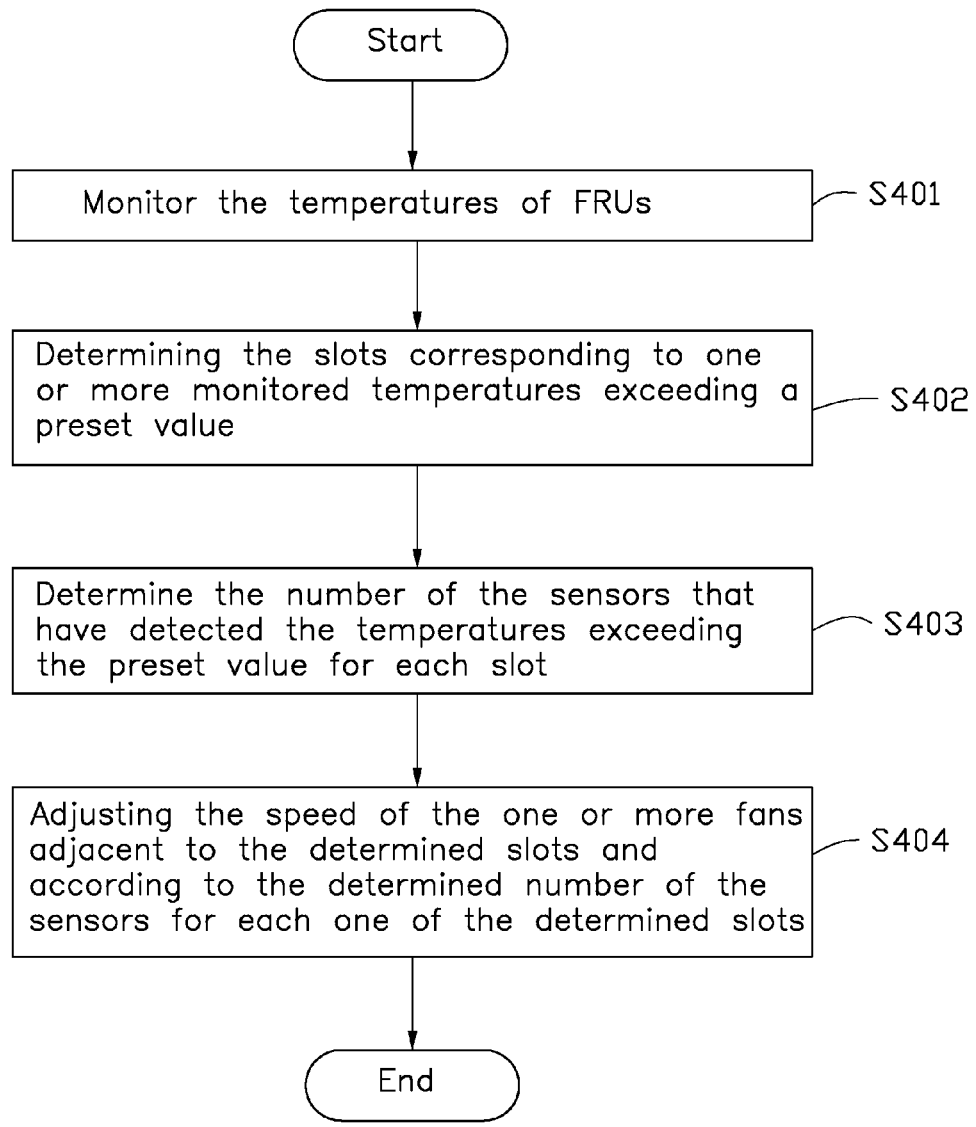
FIG. 2 is a flowchart of an exemplary embodiment of a method implemented by the modular computer system of FIG. 1.

Referring to FIG. 2, a flowchart of a method for controlling fans 41 of the modular computing system 10. In step 401, the shelf manager 20 monitors the temperatures of the field replaceable units 80 according to the signals from the sensors 30. In step 402, when there is one or more monitored temperatures exceeding a preset value, the shelf manager 20 determines the slot(s) 60 corresponding to the one or more monitored temperatures, according to the table. In step 403, the shelf manager 20 then determines the number of the sensors 30 that have detected the temperatures exceeding the preset value, for each slot 60. In step 404, the shelf manager 20 then adjusts one or more fans 41 adjacent to each determined slot 60 according to the determined number of the sensors 30.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A modular computing system comprising:
    a fan tray comprising a plurality of fans;
    a plurality of slots;
    a plurality of field replaceable units inserted into the plurality of slots;
    a plurality of sets of temperature sensors, wherein each set of temperature sensors is configured to detect temperatures of different portions of each field replaceable unit; and
    a shelf manager to store a table that records relationships of distances between the slots and the plurality of fans, and correlation relationships between the slots and the plurality of sets of temperature sensors, the shelf manager being configured for monitoring the temperatures of different portions of each field replaceable unit according to signals from the temperature sensors;
    wherein when there is one or more monitored temperatures exceeding a preset value, the shelf manager determines the slots corresponding to the one or more monitored temperatures according to the table, determines the number of the sensors that have detected the one or more temperatures exceeding the preset value for each slot, and adjusts the speed of the one or more fans adjacent to the determined slots according to the determined number of the sensors for each one of the determined slots;
    wherein the magnitude of adjustment of the speed of the one or more fans is in direct proportion to the determined number of the sensors.

2. The modular computing system according claim 1, further comprising a power source to provide power to the fan tray, the plurality of slots, the plurality of sets of temperature sensors, and the shelf manager.

3. A method implemented by a modular computing system, the method comprising:
- a shelf manager monitoring a plurality of sets of temperature sensors of a plurality of field replaceable units inserted into a plurality of slots according to the signals from the temperature sensors;
- the shelf manager storing a table that records relationships of distances between the slots and a plurality of fans, and correlation relationships between the slots and the plurality of sets of temperature sensors, the shelf manager being configured for monitoring the temperatures of different portions of each field replaceable unit according to signals from the temperature sensors;
- the shelf manager determining the slots corresponding to one or more monitored temperatures according to the table exceeding a preset value;
- the shelf manager determining the number of the sensors that have detected the temperatures exceeding the preset value for each slot; and
- adjusting the speed of the one or more fans adjacent to the determined slots according to the determined number of the sensors for each one of the determined slots, wherein the magnitude of adjustment of the speed of the one or more fans is in direct proportion to the determined number of the sensors.

\* \* \* \* \*